United States Patent
Wikey

[11] 3,891,535
[45]* June 24, 1975

[54] AQUARIUM WATER TREATMENT APPARATUS

[76] Inventor: Arnold Wikey, 5040 W. Newport, Chicago, Ill. 60641

[*] Notice: The portion of the term of this patent subsequent to Oct. 30, 1990, has been disclaimed.

[22] Filed: July 9, 1973

[21] Appl. No.: 377,597

Related U.S. Application Data

[63] Continuation of Ser. No. 123,342, March 11, 1971, Pat. No. 3,720,014.

[52] U.S. Cl. ........... 204/275; 204/DIG. 6; 204/149; 210/169
[51] Int. Cl. ....... C02b 1/82; B01k 3/00; C02b 3/00
[58] Field of Search............... 204/149, 275, DIG. 6; 210/169

[56] References Cited
UNITED STATES PATENTS

| 751,986 | 2/1904 | Kartzmark | 204/149 |
| 3,479,281 | 11/1969 | Kikindai et al. | 204/149 X |
| 3,769,196 | 10/1973 | Wikey | 204/275 |
| 3,778,307 | 12/1973 | Beer et al. | 117/221 |

FOREIGN PATENTS OR APPLICATIONS

| 189,214 | 11/1905 | Germany | 204/DIG. 6 |

Primary Examiner—John H. Mack
Assistant Examiner—A. C. Prescott
Attorney, Agent, or Firm—Alter and Weiss

[57] ABSTRACT

Water treatment apparatus for use in aquariums and the like comprising the serial arrangement of spaced apart paralled disposed plates positioned in the water being treated. Consecutive plates are oppositely polarized at a relatively low voltage. The polarization of the plates is periodically or randomly reversed. The apparatus acts to kill bacteria, aerate and increase the circulation of the water thereby improving the general environment of the aquarium.

4 Claims, 3 Drawing Figures

AQUARIUM WATER TREATMENT APPARATUS

This invention is a continuation in part of my prior application filed on Mar. 11, 1971, having Ser. No. 123,342, now U.S. Pat. No. 3,720,014 and entitled WATER TREATMENT APPARATUS AND METHOD. This invention relates to water treatment apparatus and more particularly to apparatus for improving the environment of the aquariums and the like.

Just as the death of natural bodies of water is caused by cultural and natural eutrophication, fish tanks and aquariums are also subject to the hazards of natural pollution. Among the most prominent characteristics of such nonusable polluted fish tank water are the high bacteria count and lack of oxygen. Of course, there are other characteristics, such as a putrid smell and/or algae, for example.

In the past, aeration of fish tanks and aquariums has been accomplished through the use of pumps and agitators. The pumps and agitators are relatively inefficient and noisy. Furthermore, they fail to reduce the bacteria in the tank.

Accordingly, an object of this present invention is to provide economical and efficient equipment for aerating fish tanks and the like.

A related object of the present invention is to provide the apparatus for aerating water while sterilizing the water.

A further object of this present invention is to provide electrolysis equipment for use in sterilizing water, wherein the electrolysis equipment is resistant to residual insulation.

Yet another object of the present invention is to provide electrolysis equipment, wherein such equipment utilizes a change of polarity to prevent residual insulation.

Yet another object of this invention is to provide an aerating and circulating pump with no moving parts for use on fish ponds or aquariums.

Yet a further object of the invention is to provide low voltage, low current flow electrolysis equipment that can be used to both aerate and sterilize water to overcome pollution.

A preferred embodiment of the present invention utilizes two or more plates spaced apart and insulated from each other. The plates are immersed in a fish tank or the like. A power source is provided for oppositely polarizing juxtaposed plates. A low voltage field is periodically reversed to prevent any buildup of impurities on the plates. Means may further be provided for carrying the released gases; i.e., the oxygen to the bottom of the bodies of waters to enhance the aerating effect along with the sterilization of the water.

The foregoing and other objects and advantages of this invention and the manner of obtaining them will be more apparent, and the invention itself will be best understood by reference to the following description of an embodiment of this invention taken in conjunction with the accompanying drawings, wherein.

Figure 1:
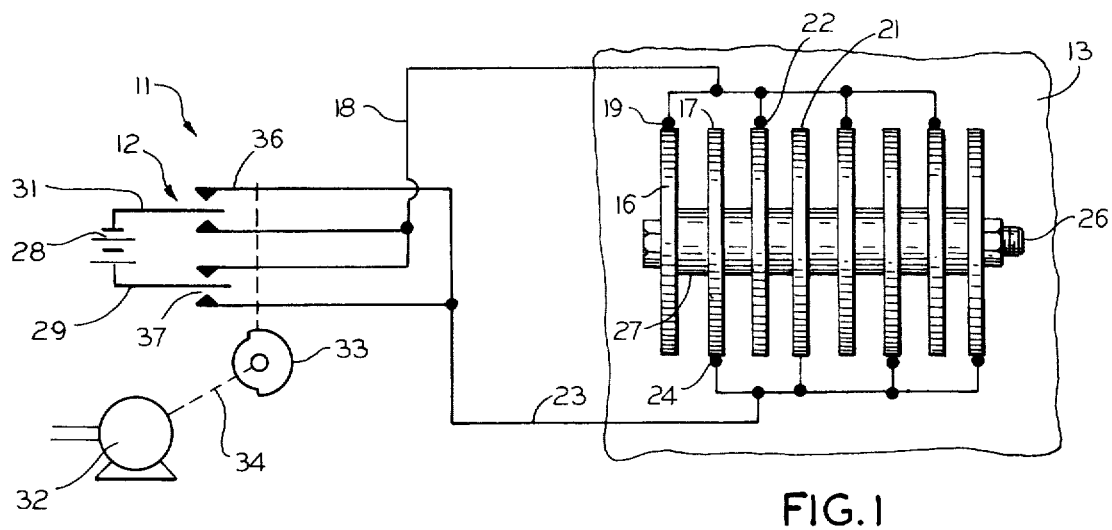
FIG. 1 is a schematic view of the inventive water aerating treatment apparatus.

In FIG. 1 the number 11 generally shows the electrolysis apparatus utilized for aerating and treating water in fish tanks, aquariums and the like. A reversing power supply generally designated as 12 feeds power to the electrodes units 13 diagrammatically shown under water 14. The electrode unit comprises a plurality of juxtaposed plates or electrodes, such as electrodes 16 and 17. In a preferred embodiment of the invention, the electrodes are plates made of platinum coated titanium.

The consecutive plates are oppositely polarized. For example, when plate 16 is positively polarized, then plate 17 is negatively polarized. The conductor 18 is connected to plate 16 and 19 and then passes around or through plate 17. There is no electrical connection between plate 17 and conductor 18. The plate 21 is also connected to the alternate plates, Similarly, conductor 23 is coupled to the alternate plate commencing with plate 17 at 24.

The plates are all shown mounted on an insulated rod 26 and separated from each other with insulated washers, such as washer 27. In a preferred embodiment of the invention, the washers are made from teflon.

The power supply 12 is shown schematically as comprising a D.C. source, such as battery 28, which is connected to conductors 29 and 31.

Means are provided for periodically changing the polarity of the electrodes. As schematically shown in FIG. 1, a small synchronous motor is coupled to a source of A.C. power. The motor 32 drives cam 33 through a drive shaft 34. As the cam rotates, it operates a pair of switches 36 and 37 simultaneously to interconnect conductors 29 and 31 to conductors 18 and 23, respectively.

It should be understood, of course, that any well known means for periodically or randomly changing the polarity of the alternate plates, such as plates 16 and 17, for example, can be used within the scope of this invention.

In a preferred embodiment of the invention, the plates are maintained at a distance of 1/64 inch apart by the insulators and a 6 volt D.C. source is utilized. The amperage between the plates, of course, depends on the size of the plates and the conductivity of the water in which the electrodes are placed. Nonetheless, the relative amperage of the preferred embodiment is in the order of ½ amp. With the low voltage across the alternate plates, the water tends to electrolyze and break into its constituent gases; i.e., two parts hydrogen and one part oxygen. With a platinum coated titanium plate, the bubbles of gas including oxygen are extremely small, and the plates themselves tend to resist any buildup of residue of impurities thereon. In addition, the reversing of the polarity also has tendencies to retain the plates in a clean condition so that they maximize the action of electrolysis obtained between the plates.

Figure 2:
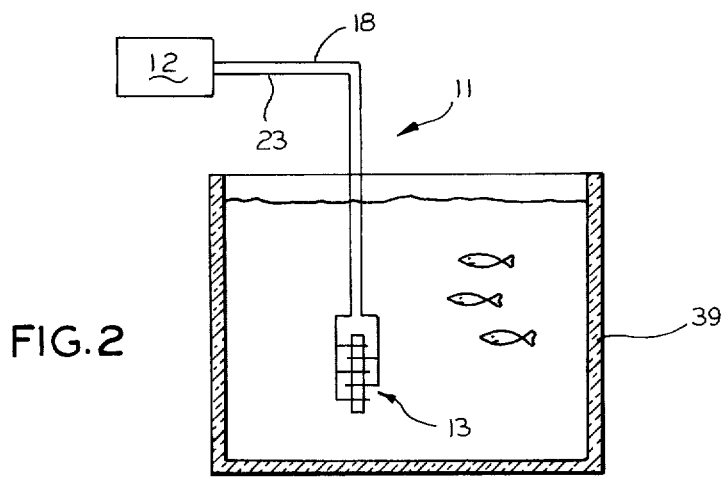
FIG. 2 shows the apparatus of FIG. 1 adapted for use in fish ponds or aquariums.

FIG. 2 shows utilization of the apparatus of FIG. 1 in a fish tank 39 where it is used for purifying and aerating the water. The size of the fish tank is of little consequence since more electrode units are added if required by the volume of water and number of fish in the aquarium.

The electrode unit 13 is shown connected to a power supply 12. The showing, of course, is schematic, and the plates of the unit are in actuality more closely packed together to be within the dimensions set forth in the description of the plates of FIG. 1.

Figure 3:
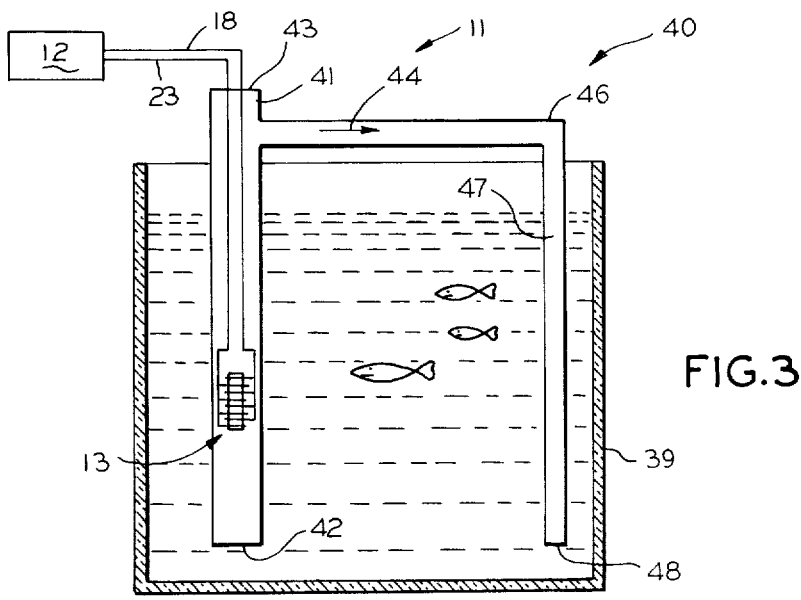
FIG. 3 shows a further refinement of the apparatus of FIG. 1.

FIG. 3 teaches the device utilizing the electrolysis apparatus 11 in a way, that among other things, overcomes thermal stratification which may occur on larger aquariums. More particularly, FIG. 3 shows means for increasing the circulation of the water and interspersion of oxygen therein affected by the electrolysis. A circulating device, such as vertical tube 41, is provided which surrounds the electrolysis unit 13. The electrolysis unit is connected through conductors 18 and 23 to a source of power, such as power source 12. The bottom 42 of tube 41 is open to enable the flow of water therein. The top 43 of tube 41 is also open and extends above the normal level of water in the tank. A pumping action in tube 41 is caused by the electrolysis action of apparatus 13. In fact, the level of the water in tube 41 increases until water is flowing in the direction shown by arrows 44 in the horizontal tube 46 and back down through second vertical tube 47. The water that flows through the three tubes is forced therethrough by the electrolysis action and because of the electrolysis action contains a plethora of oxygen bubbles. The hydrogen that is released in tube 41 escapes into the atmosphere at opening 43. The water containing the oxygen bubbles passes back down through tube 47 which is open at the bottom portion 48 thereof to enable aerated water to flow therethrough and supply oxygen to the lower levels of the tank.

For aquariums, the extra circulation increases the oxygen in all levels of the tank and contributes to the health of the fish life in the aquariums.

A sufficient number of such tube arrangements designated as 40 is placed in the aquarium to assure a proper supply of oxygen and incidentally to kill bacteria. The tubes 41, 44 and 47 can be made of plastic, glass or they can even be metallic.

Thus, there is herein described an electrolysis unit uniquely suited for treating water by aeration and sterilization. The water treated, as described herein, can either be for aquariums, fish ponds or fish tanks. The apparatus described herein effectively counteracts increased biochemical oxygen demand.

While the above principles and advantages of the invention have been described in connection with specific arrangements and apparatus, it is to be clearly understood that the description is only made by way of example and not as a limitation on the scope of the invention.

I claim:

1. Water treatment apparatus for aerating and sterilizing fish tanks,
    said apparatus comprising at least one pair of electrodes immersed in said fish tank,
    said electrodes being juxtaposed but non-contiguous to one another,
    a low voltage source for oppositely polarizing said electrodes to cause electrolysis of the water to release gases for simultaneously sterilizing and aerating the water,
    means for periodically changing polarization to maintain the gaseous discharge at said electrodes,
    tube means surrounding said electrolysis unit in said fish tank,
    said tube means comprising a first vertical tube opened at the bottom thereof,
    said tube means further comprising a second vertical tube,
    said second vertical tube closed at the top and open at the bottom thereof,
    a horizontal tube joining said first and second vertical tubes, and
    said horizontal tube being located so as to be below the surface of the water when said fish tank is in operation, whereby circulation for aeration is accomplished by the electrodes being energized to force water from said first vertical tube through said horizontal tube and said second vertical tube to aerate the lower levels of said fish tank.

2. The apparatus of claim 1 wherein said horizontal tube joins said second vertical tube at the top thereof so that the second vertical tube is closed at the top thereof.

3. A water treatment apparatus for aerating and sterilizing fish tanks,
    said apparatus comprising at least one pair of electrodes immersed in said fish tank, said electrodes being juxtaposed but non-contiguous to one another,
    a low voltage source for oppositely polarizing said electrodes to cause electrolysis of the water to release gases to simultaneously sterilize and aerate the water,
    means for periodically changing the polarization to maintain the gaseous discharge at said electrodes,
    tube means surrounding said electrolysis unit in said fish tank,
    a horizontal tube joining said first and second vertical tubes,
    said electrodes disposed within said first vertical tube,
    said first and second vertical tubes extending below the water line and open at said tube bottoms,
    said first vertical tube also open at the top and said second vertical tube closed at the top,
    said horizontal tube providing a conduit for circulation of aerated water from said first vertical tube through said horizontal tube and down said second vertical tube into the water adjacent to the bottom of the tank.

4. The apparatus of claim 3 wherein said electrodes are spaced 1/64 inch apart,
    said space maintained by insulators disposed between said electrodes, and
    said electrodes being platinum plated titanium in plate shape.

* * * * *